(12) United States Patent
Seiler et al.

(10) Patent No.: US 9,570,929 B2
(45) Date of Patent: Feb. 14, 2017

(54) FIELD DEVICE WITH A BATTERY UNIT (75) Inventors: Christian Seiler, Auggen (DE); Marc Fiedler, Reinach (CH)

(73) Assignee: Endress + Hauser Process Solutions AG, Reinach (CH)

( * ) Notice: Subject to any disclaimer, the term of this patent is extended or adjusted under 35 U.S.C. 154(b) by 688 days.

(21) Appl. No.: 13/995,617

(22) PCT Filed: Nov. 23, 2011

(86) PCT No.: PCT/EP2011/070848
§ 371 (c)(1),
(2), (4) Date: Jun. 19, 2013

(87) PCT Pub. No.: WO2012/084394
PCT Pub. Date: Jun. 28, 2012

(65) Prior Publication Data
US 2013/0278222 A1    Oct. 24, 2013

(30) Foreign Application Priority Data
Dec. 21, 2010    (DE) .................. 10 2010 063 783

(51) Int. Cl.
*H02J 7/00*    (2006.01)
*H01M 2/34*    (2006.01)
(Continued)

(52) U.S. Cl.
CPC .............. *H02J 7/0063* (2013.01); *H01M 2/34* (2013.01); *H01M 10/425* (2013.01);
(Continued)

(58) Field of Classification Search
CPC ...................................................... H02J 7/0063
(Continued)

(56) References Cited

U.S. PATENT DOCUMENTS 3,659,180 A     4/1972   Urbush
5,097,184 A *   3/1992   Echtler .................... H02P 7/14
                                                        318/109

(Continued)

FOREIGN PATENT DOCUMENTS

DE           19756167 A1    8/1999
DE       102004008569 A1    9/2005
(Continued)

OTHER PUBLICATIONS

Dec. 9, 2011 German Search Report, German Patent Office, Munich, Germany.
(Continued)

*Primary Examiner* — Drew A Dunn
*Assistant Examiner* — Jerry D Robbins
(74) *Attorney, Agent, or Firm* — Bacon & Thomas, PLLC (57) ABSTRACT

An apparatus comprising a battery unit and an electronics unit. The battery unit has a battery with a first and a second pole. The battery unit has at least a first, at least a second and at least a third electrical contact, wherein the first contact and the third contact are connected with the first pole, and wherein the second contact is connected with the second pole. The electronics unit has an input circuit with at least a first and at least a second electrical countercontact for receiving electrical energy from the battery unit essentially via the first and second contacts or essentially via the second and third contacts of the battery unit.

16 Claims, 3 Drawing Sheets

(51) Int. Cl.
  *H01M 10/42* (2006.01)
  *H02H 9/00* (2006.01)

(52) U.S. Cl.
  CPC .......... *H02J 7/0029* (2013.01); *H02J 7/0045* (2013.01); *H02H 9/008* (2013.01)

(58) Field of Classification Search
  USPC ........................................................ 320/135
  See application file for complete search history.

(56) References Cited

U.S. PATENT DOCUMENTS

| | | | |
|---|---|---|---|
| 5,200,686 A | | 4/1993 | Lee |
| 5,216,371 A | | 6/1993 | Nagai |
| 5,473,242 A | | 12/1995 | McKenna |
| 5,729,115 A | | 3/1998 | Wakefield |
| 6,634,896 B1 * | | 10/2003 | Potega ................... G01K 1/02 374/E1.002 |
| 6,945,803 B2 * | | 9/2005 | Potega ................... G01K 1/02 374/E1.002 |
| 7,202,576 B1 | | 4/2007 | Dechene et al. |
| 8,031,453 B2 * | | 10/2011 | Nelson ................. H05K 7/1462 361/92 |
| 2004/0112730 A1 | | 6/2004 | Blossfeld |
| 2004/0230401 A1 * | | 11/2004 | Duren ................. G05B 19/409 702/184 |
| 2005/0186471 A1 | | 8/2005 | Titschert et al. |
| 2007/0145827 A1 * | | 6/2007 | Paik ........................ H02J 9/06 307/43 |
| 2010/0244806 A1 * | | 9/2010 | Probst ..................... G05B 9/02 323/304 |
| 2011/0171497 A1 * | | 7/2011 | McGuire ............ H01M 2/0443 429/7 |

FOREIGN PATENT DOCUMENTS

| | | |
|---|---|---|
| WO | 9211679 A1 | 7/1992 |
| WO | 2012084394 A1 | 6/2012 |

OTHER PUBLICATIONS

Feb. 13, 2012 International Search Report, EPO, The Netherlands.
Jul. 4, 2013 English Translation of IPR, WIPO, Geneva, Switzerland.

* cited by examiner

FIELD DEVICE WITH A BATTERY UNIT

TECHNICAL FIELD

The invention relates to an apparatus comprising an electronics unit and a battery unit, wherein the battery unit has a battery with a first and a second pole.

Furthermore, the invention relates to a battery unit and to an electronics unit for use in such an apparatus and to a field device with such an apparatus.

BACKGROUND DISCUSSION

Currently, a large number of electrical and/or electronic devices are supplied with energy by a battery, respectively a battery unit. The terminology, battery, in the sense of the present application, includes, in such case, a single-use battery, a rechargeable battery, and other dischargeable energy storers, respectively energy converters, such as, for example, a capacitor, which can deliver a limited amount of energy. The battery has, in such case, at least one electrically positive, and at least one electrically negative, pole. The device, or especially its electronics unit, can thus be supplied and operated with electrical energy withdrawn from the battery, for example, energy in the form of an electrical current and/or an electrical voltage.

Such battery operated devices are used, for instance, in the field of process automation technology. Thus, for example, field devices can be equipped with a battery operated radio unit, which has a battery unit containing a battery. In this connection, it is known to supply both the radio unit as well as also the connected field device with electrical energy from the battery of the battery unit. Furthermore, autarkic field devices exist, which have a battery, which serves for supplying the field device with the energy required by the field device. The terminology, field devices, means, in such case, in principle, all devices, which are applied near to the process and which deliver or process information relevant for the process. Besides the earlier mentioned measuring devices/sensors and actuators, also considered to be field devices are generally units, which are connected, for example, directly to a fieldbus and serve for communication with superordinated units—thus, units such as e.g. remote I/Os, gateways, linking devices and radio units. In the case of battery operated field devices, of course, it is desired to increase their operating time, respectively service life, as much as possible. Currently known from the state of the art are numerous methods and circuits directed toward this goal.

However, in explosion-endangered zones special requirements govern the application of electrical and/or electronic equipment. Thus, it is, for example, known from the state of the art to use battery driven field devices in explosion-endangered zones. Such field devices make use of electrical current- and/or voltage limiting, in order to meet these special requirements. In such case, corresponding means for electrical current- and/or voltage limiting are provided for the electronics unit in the region of the battery connection as well as also in the battery itself, in order to block ignition-capable amounts of electrical energy. These Ex-limiting measures do, however, due to the means for electrical current- and/or voltage limiting in the connection region of the field device as well as also in the battery unit, result in a not insignificant loss of power. This power loss, which cannot be utilized, shortens the service life of the battery.

Devices that are provided exclusively for operation in a non-explosion endangered region do not have these electrical current- and/or voltage-limiting measures. The percentage of applications for non-explosion endangered zones lies today at about 80-90% of all applications.

For reasons of cost, it is often advantageous not to manufacture two variants of a battery unit, respectively battery operated field device, so that, most often, the Ex-variant of the battery, respectively the field device, is applied also in the non-Ex region. Due to the high energy consumption resulting from the Ex-limiting measures, one is, however, frequently compelled to manufacture and/or to offer either the battery unit and/or the field device also without the Ex-limiting measures.

Moreover, field devices, such as sensors, actuators or display- and/or service units, depending on functionality, such as, for example, the used measuring principle, require different amounts of energy, and, thus, have different power- and/or energy consumptions. It is, consequently, necessary to manufacture different variants of battery units and/or electronic units, in order to provide an energy supply generally matched to the function of the field device or, in general, the device.

Due to the large number of manufacturers of (field-) devices and (field-)device types, there are currently different forms of housings for battery units and electronics units as well as different contactings of such. In such case, a certain battery unit is, most often, matched specially to a single device, or device type, and, consequently, only applicable in combination with such. Furthermore, the electrical power withdrawable from a battery unit is, most often, predetermined by the no load voltage between the, usually, two contacts of the battery unit and is, thus, not variable.

SUMMARY OF THE INVENTION

An object of the invention is to overcome these disadvantages known from the state of the art.

The object is achieved according to the invention by features including that the battery unit has at least a first, at least a second and at least a third electrical contact, wherein the first contact and the third contact are connected with the first pole, and wherein the second contact is connected with the second pole, and wherein the electronics unit has an input circuit with at least a first and at least a second electrical countercontact for receiving electrical energy from the battery unit essentially via the first and second contacts or essentially via the second and third contacts of the battery unit.

Thus, a battery unit with a battery is provided and the battery unit has a plurality of, however, at least three, electrical contacts. In such case, at least two of the contacts are connected to one and the same pole of the battery and one of the contacts to the other pole of the battery. Thus, one pole of the battery always has at least a plurality of electrical contacts, via which it is contactable. In an embodiment, each of the two poles has a plurality of, for example, two, electrical contacts. In such case, the battery unit is electrically and preferably also mechanically connectable with an electronics unit via corresponding contacts and corresponding countercontacts.

The first countercontact serves, in such case, to connect the input circuit with a first pole of the battery of the battery unit and the second countercontact serves to connect the input circuit with a second pole of the battery. In such case, the first pole of the battery can be connectable via the first contact and/or third contact with the first countercontact. The second pole of the battery can be connectable via the second contact with the second countercontact. The proposed battery unit can, thus, be connected to different electronic units, which differ from one another especially as regards their contacting, i.e. arrangement of the countercontacts. Accompanying these different terminal configurations can also be functional differences, such as, for example, the amount of electrical energy withdrawable from the battery, for example, in the form of voltage, electrical current and/or power, wherein these differences can be compensated by the proposed apparatus, especially battery unit.

Furthermore, different installed positions can be provided, in which the battery unit is connectable with the electronics unit, wherein the transmission of the electrical energy, especially the electrical power, between the battery unit and the electronics unit depends on the current installed position. Through the installed position, for example, the contacts of the battery unit can be contacted with the corresponding countercontacts of the electronics unit. On the other hand, it is possible that, in such installed position, i.e. in the case of one and the same orientation of the battery unit relative to the electronics unit, a different contacting and thus transmission of a different amount of electrical energy, especially power, happens between battery unit and electronics unit. In an embodiment of the present invention, in such case, blocking or contact means can be applied or exchanged, which enable, or prevent, as the case may be, an electrical contacting of one or more contacts and/or countercontacts. Furthermore, the blocking and/or contact means can serve to assure that only a certain installed position is possible between battery unit and electronics unit and thereby especially only a certain connector configuration is enabled between the contacts and countercontacts.

In an embodiment of the apparatus, the electrical contacts, respectively countercontacts, are part of an installation plug or socket, i.e. part of a housing, of the battery unit, or the electronics unit. Especially, the battery unit and the electronics unit, respectively their housings, are so embodied that the battery unit is connectable with the electronics unit and thereby the electrical contacting between the contacts and the countercontacts comes to be. To this end, the battery unit and the electronics unit can have correspondingly formed housings or housing parts, which have corresponding connecting elements, which engage with one another and on which connecting elements the contacts of the battery unit, respectively countercontacts of the electronics unit, are arranged.

In a form of embodiment of the apparatus, electrical energy from the battery of the battery unit is transmittable from the battery unit to the electronics unit essentially via the first and second contacts and the first and second countercontacts or essentially via the second and third contacts and the first and second countercontacts. The battery unit is, for example, so connectable with the electronics unit that, selectively, a contacting occurs between the first and second contacts and the first and second countercontacts or between the second and third contacts and the first and second countercontacts.

The second contact, as well as especially also the second countercontact, can, in such case, be formed of a plurality of mutually separated electrical contact elements, or countercontact elements, such as, for example, pins. The countercontact elements can be electrically connected with one another by the input circuit of the electronics unit, wherein they are, however, only individually contactable by the battery unit. In a first installed position, for example, a first pin can serve as second countercontact and in a second installed position, for example, a second pin can serve as second countercontact. Likewise the contact elements in the battery unit can be connected with one another and/or to a same pole of the battery.

In a form of embodiment of the apparatus, the input circuit has, furthermore, at least a third electrical countercontact, and the battery unit is so connectable with the input circuit that electrical energy of the battery of the battery unit is transmittable from the battery unit to the electronics unit essentially via the first and the second contacts and the first and second countercontacts or essentially via the second and the third contact and the second and the third countercontact. While a building of the proposed invention for the first and the third contact, or first and third countercontact always requires different contact elements, i.e. (counter-)contact elements separated from one another, such as, for example, pins or sockets, the second contact, respectively second countercontact, can also be implemented by, in each case, just a single such contact element. However, it is, according to the present invention, also an option to use a plurality of (counter-)contact elements, which serve as second contact, respectively as second countercontact, via which (counter-)contact elements, such as, for example, pins, always the same pole of the battery of the battery unit is contacted.

In an additional embodiment of the apparatus, the battery unit, preferably by orienting, especially by rotating, especially preferably by rotating around a longitudinal axis of the battery unit, is so connectable with the input circuit of the electronics unit that either only the first contact is electrically connected with the first countercontact and the second contact with the second countercontact, or that only the second contact is connected with the second countercontact and the third contact is connected with the third countercontact. For this purpose, a number of installed positions can be provided, in which the battery unit is connectable, especially pluggable, with the electronics unit.

In an additional embodiment of the apparatus, a blocking means is provided, which serves to prevent at least the electrical contacting of at least one of the contacts, especially the first contact, and/or of at least one of the countercontacts, especially the first countercontact. In this way, for example, an electrical contacting between one or more of the contacts and countercontacts can be prevented, while the installed position remains unchanged, or, however, by installing the blocking means, an installed position, especially one of a plurality of predetermined installed positions, can be blocked, so that the therewith associated connector configuration between the contacts and countercontacts cannot be brought to fruition.

In an additional embodiment of the apparatus, the blocking means, which is composed preferably of an essentially electrically insulating material, serves to close, especially mechanically, at least one of the contacts and/or at least one of the countercontacts. In this way, not only the mechanical connection but also the electrical contacting of the corresponding contact and/or contercontact is prevented. The blocking means can be especially a cap, a stopper or a pin, which can be removed or installed. A user can remove or install this blocking means also on-site, so that the manufacturer needs to warehouse only one variant of the device.

In an additional embodiment of the apparatus, the blocking means is replaceable by a contact means, which preferably is composed of an essentially electrically conductive material, which contact means serves to produce electrical contact between at least one of the contacts, especially the first contact, and at least one of the countercontacts, especially the first countercontact.

In an additional embodiment of the apparatus, for limiting the electrical power available to the electronics unit, especially according to the specifications of the ignition protection type, intrinsic safety (Ex), means for electrical current- and/or voltage limiting are provided in a first line between the first pole of the battery and the third contact and/or in a second line between the third countercontact and the electronics unit. By corresponding means, a limiting of the electrical power output from of the battery unit and/or withdrawn by the electronics unit can occur.

The apparatus proposed in this embodiment provides a structural and circuit-technical measure in the battery unit as well as also in the input circuit of an electronics unit, which permits production of a (single) device variant for both Ex- and non-Ex applications, without requiring that energy losses must be tolerated in non-Ex applications. Thus, a cost effective production of devices can occur, since only one variant needs to be provided for different interface connections of the battery unit and/or the electronics unit, especially for Ex- or non-Ex operation.

In an additional embodiment of the apparatus, a contacting of the battery unit via the first and second contacts and the first and second countercontacts serves to bypass the means for electrical current- and/or voltage limiting. Thus, there occur no energy losses in the case of the non-Ex version from Ex-limiting measures in the battery unit as well as also in the field device. To this end, a circuit branch, which leads through the first contact and the first countercontact can have a smaller electrical resistance than a circuit branch, which leads through the third contact and the third countercontact.

In an additional embodiment of the apparatus, the input circuit has, furthermore, a first and a second output, via which the energy provided for the electronics unit and especially withdrawn from the battery of the battery unit is tappable. In such case, the first countercontact and the third countercontact can be connected with the second output and wherein the second countercontact can be connected with the first output.

In an additional embodiment of the apparatus, the apparatus includes an electrical and/or electronic circuit, which, especially based on an electrical signal in the first and/or second circuit branch, serves to detect whether the energy supply of the electronics unit occurs essentially via the first and second contacts, respectively countercontacts, or essentially via the second and third contacts, respectively countercontacts. In such case, a digital and/or analog comparator circuit can compare the two input signals with one another and output a corresponding signal to the electronics unit. This detection circuit permits detecting whether the interface module is, for example, an Ex- or non-Ex interface module. Correspondingly, (calculation-)parameters for ascertaining battery service life and other settings of the electronics unit can be automatically set.

In an additional embodiment of the apparatus, the electrical current- and/or voltage limiting occurs via at least a first electrical and/or electronic component, especially a diode, in the second circuit branch.

In an additional embodiment of the apparatus, the electrical and/or electronic circuit is composed of a comparator circuit, which compares a first and a second input signal with one another, wherein the first component is arranged between a tap for the first input signal and a tap for the second input signal. In an additional embodiment of the apparatus, there is arranged between the tap for the first input signal and a corresponding input of the comparator circuit a second component corresponding to the first component and having essentially the same physical, especially electrical, properties as the first component.

The object of the invention is also achieved by a battery unit for use in an apparatus as defined in one of the preceding embodiments.

The object of the invention is also achieved by an electronics unit for use in an apparatus as defined in one of the preceding embodiments.

Furthermore, the object is achieved by a field device of process automation technology having an apparatus as defined in one of the preceding embodiments. The battery unit can, in such case, be applied in the field device and its housing and be connected with the electronics unit of the field device. The field device can be a sensor, an actuator, a display and/or a service unit. Furthermore, the field device can be a radio unit, which is connectable to a field device. The electronics unit can be the operating electronics of the field device, by which such is controlled and which serves for performing the functions of the field device, especially for energy management of the field device.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
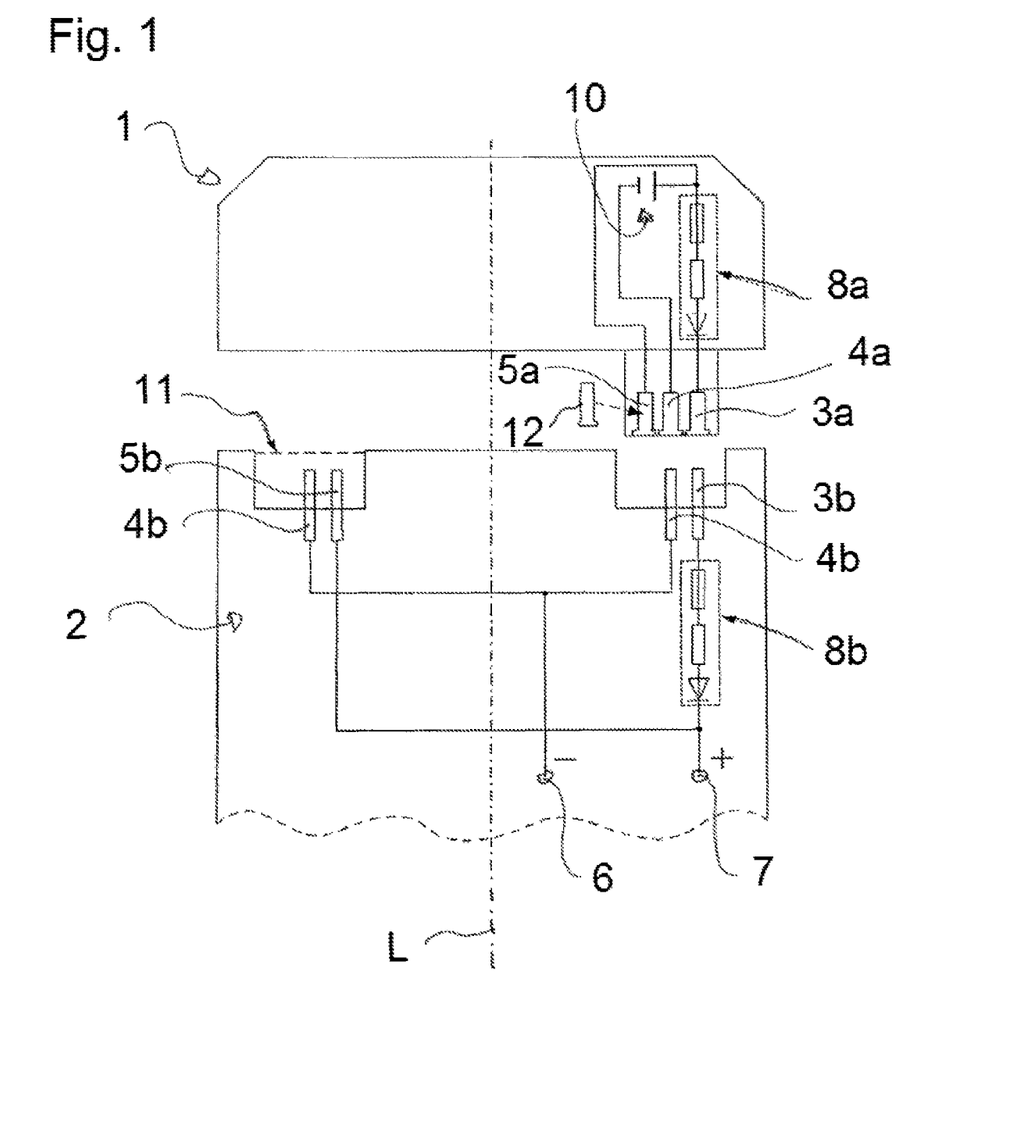
FIG. 1 is a schematic representation of a battery unit and an input circuit of an electronics unit in a first form of embodiment of the proposed invention.

FIG. 1 shows a battery unit 1 and an electronics unit 2, which are pluggable into one another. In such case, two installed positions are provided, in which the battery unit 1 and the electronics unit 2 are connectable with one another. The connecting in an installed position occurs, in such case, by corresponding orienting of the battery unit 1 relative to the electronics unit 2, respectively relative to the input circuit of the electronics unit 2 and its housing. In such case, the battery unit 1 is rotated around its longitudinal axis L, so that the housing of the battery unit 1 can engage with a correspondingly formed housing part of the electronics unit 2. Corresponding receptacles of the housing of the electronics unit 2 hold the countercontacts 3b, 4b, respectively 4b, 5b for the contacts 3a, 4a, respectively 4a, 5a of the battery unit 1, as shown in FIG. 1.

Battery unit 1 includes a battery 10, wherein one pole of the battery 10 is connected with two electrical contacts 3a, 5a, via which the battery 10 is contactable. The other pole of the battery is, according to the example of an embodiment shown in FIG. 1, only connected with one electrical contact 4a. In such case, the first and the third contacts 5a, 3a of the battery unit 1 are connected to the same pole of the battery 1, wherein in the circuit branch, which connects the third contact 3a with the pole of the battery 10, means for electrical current- and voltage limiting 8a are provided. In the circuit branch, which connects the pole with the first contact 5a, such means are not provided. Likewise in the circuit branch, which connects the other pole of the battery 10 with the second contact 4a, no means for electrical current and voltage limiting are provided. The electrical contacts 3a, 4a, 5a are, in such case, for example, connector sockets, which serve for receiving, and contacting, connector pins, which form electrical countercontacts 3b, 4b, 5b for the contacts 3a, 4a, 5a of the battery unit 1.

FIG. 1 shows, furthermore, an input circuit of the electronics unit 2 with a housing, which is so formed that the battery unit 1 is connectable in two installed positions with the electronics unit 2, respectively its input circuit. In both installed positions, the battery unit 1, in such case, essentially continues the contour of the housing of the electronics unit 2 without discontinuities. In such case, the battery unit 1 can be brought by rotating from a first position, in which the battery unit 1 is connectable, especially pluggable, with the electronics unit 2 in a first installed position, into a second position, in which the battery unit 1 is connectable, especially pluggable, in a second installed position with the electronics unit 2. The rotation occurs, in such case, about a longitudinal axis L shared by the battery unit 1 and the electronics unit 2. The longitudinal axis L forms, in such case, also a symmetry axis relative to its two connection receptacles arranged on one end of the housing of the electronics unit 2, wherein the first and second installed positions are predetermined by the connector receptacles, and wherein the countercontacts 3b, 4b, 5b are arranged in the connector receptacles. In such case, there are arranged in the first connector receptacle of the electronics unit 2 a first pin, which forms the second countercontact 4b and a second pin, which forms the first countercontact 5b. Arranged in the second connector receptacle are a third pin, which forms the second countercontact 4b and a fourth pin, which forms the third countercontact 3b. The pins are, in such case, arranged asymmetrically in the connector receptacles with respect to the longitudinal axis L.

In FIG. 1, the orientating of the battery unit 1, in order to bring the battery unit 1 from the first into the second installed position, occurs, in such case, by a rotation of 180°. However, also other arrangements of connector receptacles are possible, whereby rotations of another angle are required, in order to bring the battery unit 1 into a corresponding location and installed position.

In the position shown in FIG. 1, the battery unit 1 can be connected with the electronics unit 2 in the first installed position. In this installed position, the third contact 3a and the third countercontact 3b as well as the second contact 4a and the second countercontact 4b are connected with one another. A stopper 12 can be placed in the first contact 5a, so that an unintentional electrical contacting of the first contact 5a is prevented.

In the second installed position of FIG. 1, the second contact 4a and the second countercontact 4b and the first contact 5a and the first countercontact 5b are connected with one another. The third contact 3a creates in the second installed position no electrical contact to the electronics unit 2 and/or the input circuit.

If, however, the stopper 12 is, as indicated in FIG. 1 by an arrow leading from the stopper 12 to the first electrical contact 5a of the battery unit 1, installed, then the battery unit 1 cannot be installed in the second installed position, since stopper 12 then prevents the first contercontact 5b from entering into the first contact 5a. Alternatively, it can be provided, that, indeed, the battery unit 1 can be mechanically connected with the electronics unit 2, in spite of installed stopper 12; however, the stopper 12 prevents electrical connection between the first contact 5a and the first countercontact 5b.

The means for electrical current- and/or voltage limiting 8a shown in FIG. 1 in the battery unit 1 is in the form of a series connection of an electrical (melt-)fuse, an electrical resistor and a diode in the circuit branch between a pole of the battery 10 and the third electrical contact 3a. In the circuit branch between the first contact 5a and the pole of the battery 10, to which pole also the third contact 3a is connected, there are no, or, if at all, different, or differently designed, means for electrical current- and/or voltage limiting. Likewise the circuit branch, via which the other pole of the battery 10 is connected with the second contact 4a, is free of means for voltage limiting. If, thus, electrical energy is transmitted via the first and second contacts 5a, 4a, then there will be no electrical power losses, while in the case, in which electrical energy is transmitted from the battery 10 via the second and third contacts 4a, 3a, the power taken from the battery 10 is limited and therewith, power loss does occur.

The input circuit of the electronics unit 2 is composed, in such case, thus of the first, second and third electrical countercontacts 3b, 4b, 5b, which with a first, respectively second, output 6, 7 is connected. Tappable between the first and second outputs 6, 7 is a direct voltage, which can be used for operating the remaining electronics unit (not shown).

Furthermore, it can be provided that one of the connector receptacles, in which the pins serving as countercontacts 3b, 4b, 5b are arranged, is closed by a cap 11, so that neither a mechanical nor an electrical connection is possible in the installed position predetermined by the connector receptacle. A corresponding cap 11 is shown in FIG. 1 by the reference character 11 and the dashed line in the region of the connector receptacle.

Provided in a second circuit branch between the third countercontact 3b of the input circuit and the electronics unit 2, especially the branch going to the second output 7 of the input circuit, are likewise means 8b for power limiting. Means 8b on the part of the input circuit are composed, analogously to the situation in battery unit 1, of a series connection of a fuse, a resistor and a diode. In this way, no ignition capable sparks can arise in the region of the contacts 3a, 4a, 5a of the battery unit 1 and the countercontacts 3b, 4b, 5b, since the energy from the battery unit 1 and in the electronics unit 2 is limited by the means 8a, 8b.

In the first installed position, the second contact 4a is connected with the second countercontact 4b and the third contact 3a with the third countercontact 3b and, thus, energy is withdrawn from the battery 10 via these contacts 3a, 3b, 4a, 4b. In such case, the power removed from the battery 10 is, however, limited.

In the second installed position, the first contact 5a is connected with the first countercontact 5b and the second contact 4a with the second countercontact 4b. The contacting of the second contact 4a occurs, in such case, in the first installed position via the third pin and in the second installed position via the second pin. These first and second pins are connected in the input circuit of the electronics unit 2 via a circuit branch with one another and with the first output 6 of the input circuit. Thus there lies on the first output 6, independently of the current installed position, a connection to one pole of the battery 10, and this connection is free of means for electrical power- and/or energy limiting.

The first countercontact 5b is likewise connected via a circuit branch of the input circuit with the second output 7 of the input circuit, wherein this circuit branch is likewise free of power limiting means.

Thus, the proposed apparatus provides, as a function of the installed position of the battery unit 1 and the contacting present between the battery unit 1 and the electronics unit 2 as a function of the installed position, either a limited power removable via the first and second outputs 6, 7 of the input circuit of the electronics unit 2, or, also removable from the battery 10 via the first and second outputs 6, 7 of the input circuit, a power, for example, the nominal voltage, not limited by corresponding power limiting means.

The contacting resulting in the first installed position, as predetermined by the arrangement of countercontacts 4b, 3b, can, in such case, be provided for a first (field-)device. The contacting resulting in the second installed position, which is predetermined by the second arrangement of countercontacts 4b, 5b, can be provided for a second (field-)device. Battery unit 1 can thus be used for different (field-)devices with, in each case, differently arranged countercontacts, for example, 4b, 5b or 3b, 5b of FIG. 1.

Figure 2:
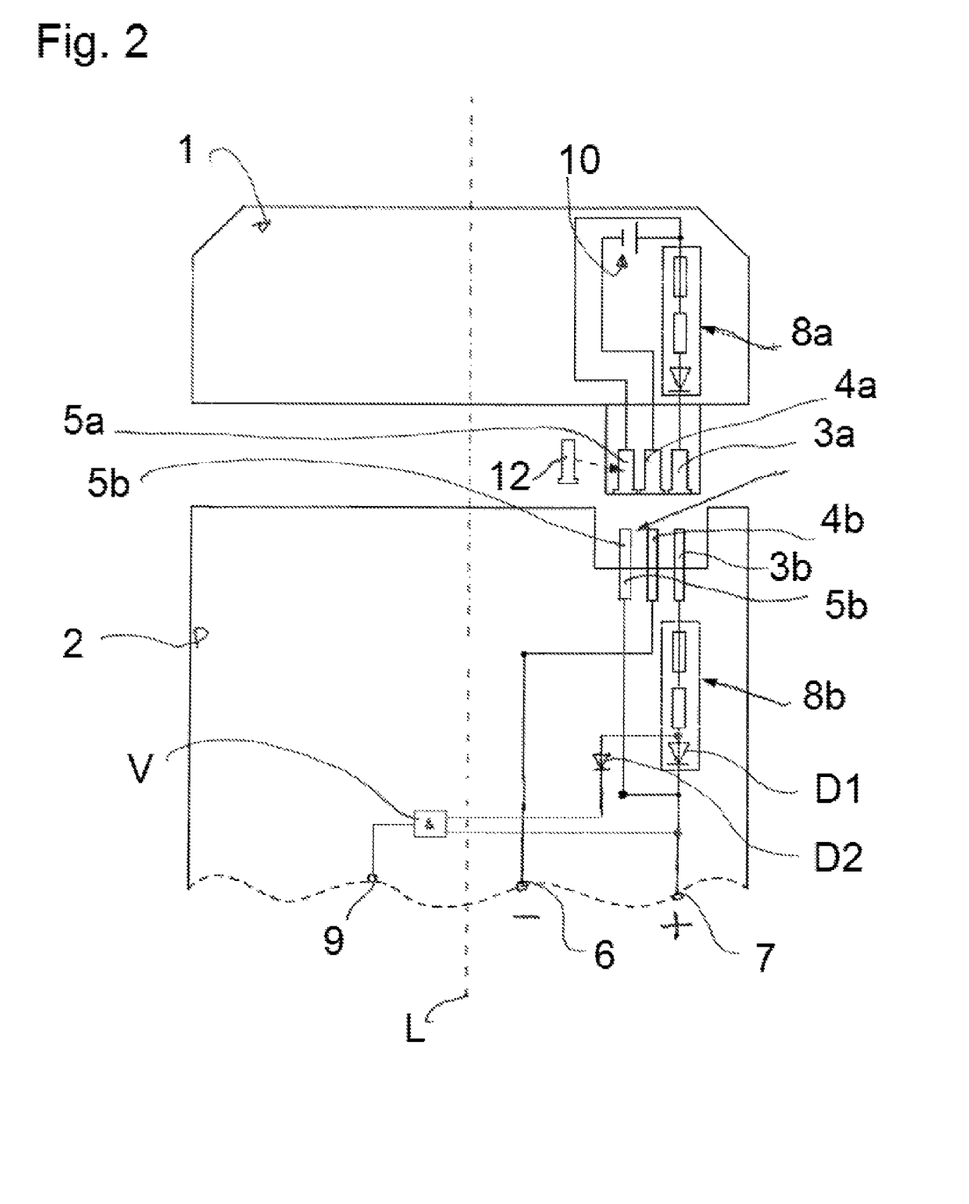
FIG. 2 is a schematic representation of a battery unit and an input circuit of an electronics unit in a second form of embodiment of the proposed invention.

FIG. 2 shows another form of embodiment of the proposed invention. In such case, only a single installed position is provided for connecting the battery unit 1 with the electronics unit 2.

Battery unit 1 corresponds, in such case, to that shown in FIG. 1. On the housing of the electronics unit 2, however, only one installed position is provided, which has the three countercontacts 3b, 4b, 5b in the form of pins. The contacts 3a, 4a, 5a of the battery unit 1 can thus only be connected in this one installed position with the countercontacts 3b, 4b, 5b. Due to the higher electrical resistance in the first and in the second circuit branches relative to the circuit branch, via which the first contact 5a and the first countercontact 5b are connected with one another, removal, or transmission, of electrical energy from the battery 10 occurs via the first contact 5a and the first countercontact 5b and the second contact 4a and the second countercontact 4b. It can, however, be provided that the already mentioned stopper 12 is used to cover one of the contacts 3a, 4a, 5a, or one of the countercontacts 3b, 4b, 5b, wherein the stopper 12 serves to prevent electrical contacting, preferably between the first contact 5a and the first countercontact 5b. In that case, the electrical energy is transmitted from the battery 10 via the second contact 4a and the second countercontact 4b and the third contact 5a and the third countercontact 5b.

The first countercontact 4b is, according to the form of embodiment in FIG. 2, same as the third countercontact 3b, connected with the second output of the input circuit 7. In the circuit branch, which connects the first countercontact 5b with the second output 6, there are, however, no, or, if at all, different, or differently designed, means in the form of electrical components for power-, or electrical current- and/or voltage limiting.

Furthermore, an electrical and/or electronic circuit 9, V, D1, also referred to as a detection circuit, is provided, by means of which it can be recognized, in which configuration the battery unit 1 is connected with the input circuit and thus with the electronics unit 2. The detection circuit is composed, in such case, essentially of a comparison circuit V, which compares a first and a second input signal with one another. The first input signal can, in such case, be tapped at a tapping point before or within the means for power limiting 8b. The second input signal can be tapped at a tapping point after the means for power limiting 8b in the second circuit branch or in the circuit branch between the first countercontact 5b and the second output 7 of the input circuit. In the example of an embodiment according to FIG. 2, the tapping is located before and behind a diode D1 in the second circuit branch. Between the tap for the first input signal and an input for the comparator circuit V, another diode D2 is provided, which has essentially the same physical properties, such as, for example, characteristic curve, etc., as the diode D1 provided for power limiting in the second circuit branch. In the case, in which the energy withdrawal from the battery 10 occurs via the third contact 3a and third countercontact 3b, then, for example, the first and the second input signals of the detection circuit are essentially equal. Serving as first and/or second input signal can be an electrical voltage or an electrical current. In the case, in which the energy withdrawal occurs via the first contact 5a and the first countercontact 5b, the first input signal differs from the second input signal, since essentially no electrical energy is transmitted via the first and second circuit branches. Thus, the electrical potential at the tapping point for the first input signal differs from the electrical potential at the tapping point of the second input signal, since the second tapping point lies in the circuit branch, or is electrically connected with this, via which electrical energy is transmitted to the electronics unit 2. Detection unit V can provide an output signal, which tells, in which connector configuration the battery unit 1 is connected with the input circuit of the electronics unit 2. This output signal can be tapped via the output 9 and/or transmitted to the electronics unit.

Figure 3:
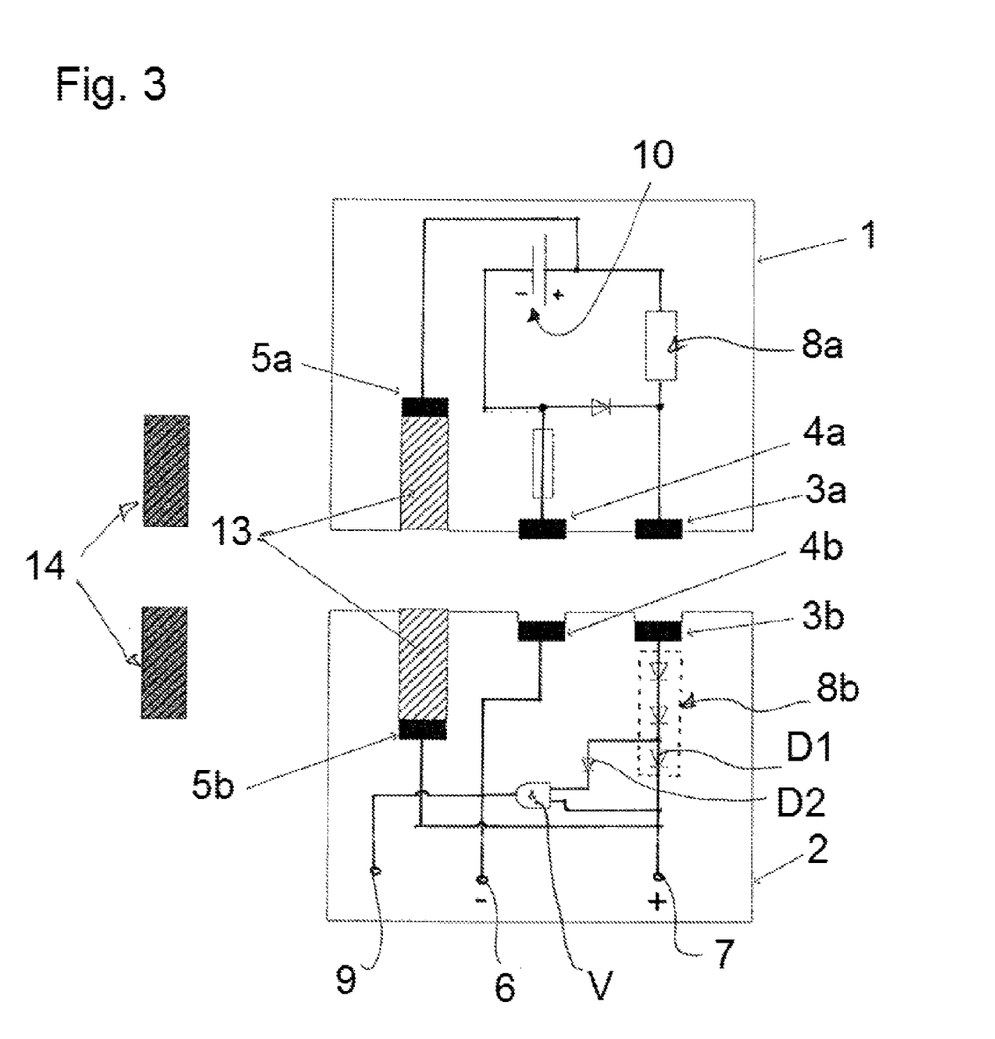
FIG. 3 is a schematic representation of a battery unit and an input circuit of an electronics unit in a third form of embodiment of the proposed invention.

FIG. 3 shows another form of embodiment of the proposed invention. Battery unit 1 has, as in the preceding examples of embodiments according to FIGS. 1 and 2, three contacts 3a, 4a, 5a. In such case, a first pole, in this case, the electrically positive pole of the battery 10, is connected with the first contact 5a and the third contact 3a. The first contact 5a is, in such case, arranged in a socket of the housing of the battery unit 1. Applied in this socket can be either a contact means 13 or a blocking means 14, so that the first contact 5a is electrically contactable with the first countercontact 5b or electrically insulated from the first countercontact 5b. The third contact 3a is connected with the electrically positive pole of the battery 10 via means for power limiting 8a. The electrically negative pole of the battery 10 is connected with the second contact 4a of the battery unit via an electrical fuse. The circuit branch, via which the negative pole of the battery 10 is connected with the second contact 4a, is connected with the circuit branch, via which the third contact 3a is connected with the positive pole of the battery 10 via a diode in blocking mode. This connection is located, in such case, between the negative pole of the battery 10 and the melting fuse, on the one hand, and between the means for voltage limiting 8a and the third contact 3a, on the other hand.

The input circuit of the electronics unit 2 includes three countercontacts 3b, 4b, 5b, wherein the first countercontact 5b is arranged in a socket of the housing of the electronics unit 2, so that a contact means 13 or a blocking means 14 is introducible into the socket, via which contact means 13 an electrical contact to the first contact 5a of the battery unit is producible, especially via a contact means 13 in the socket, in which the first contact is arranged, or the first countercontact 5b is electrically insulated via the blocking means 14.

The second contact 4a and the third contact 3a are connectable with the second countercontact 4b and the third countercontact 3b via plugged connections, which serve for electrical as well as also mechanical connection between the battery unit 1 and the electronics unit 2. The third countercontact 3b is connected with the second output 7 of the input circuit via three series connected diodes 8b. Furthermore, the first countercontact 5b is connected with the second output 7 of the input circuit, wherein, in the circuit branch between the first countercontact 5b and the second output 7, no electrical and/or electronic means serving for power limiting are provided. The second countercontact 4b is connected with the first output 6 of the input circuit.

The comparator circuit of FIG. 3 has likewise a first and a second tap for the first and second input signals, wherein the first tap is provided before and the second tap after the diode D1 for voltage limiting and, between the tap for the first input signal and the input of the comparator circuit V, another diode D2 is provided, so that, in the case of energy withdrawal from the battery 10 via the third contact 3a and the third countercontact 3b, the voltage drop between the first and the second input of the comparator circuit V is essentially identical.

The invention claimed is:

1. An apparatus comprising:
a battery unit, defining a longitudinal axis and having a housing; and
an electronics unit, defining a longitudinal axis and having a housing, wherein:
said battery unit has a battery with a first and a second pole;
said battery unit has at least a first, at least a second and at least a third electrical contact;
said first contact and said third contact are connected with said first pole;
said second contact is connected with said second pole;
said electronics unit has an input circuit with at least a first and at least a second electrical countercontact for receiving electrical energy from said battery unit essentially via said first and said second contacts or essentially via said second and third contacts of said battery unit;
said input circuit has, furthermore, at least a third electrical countercontact;
said battery unit is so connectable with said input circuit that electrical energy from said battery of said battery unit is transmittable from said battery unit to said electronics unit essentially via said first and said second contacts and said first and said second countercontacts or essentially via said second and said third contacts and said second and said third countercontacts;
said battery unit is so connectable with said input circuitry of said electronic unit that in a first installed position only said first contact is connected with said first countercontact and said second contact is connected with said second countercontact, and that in a second installed position only said second contact is connected with said second countercontact and said third contact is connected with said third countercontact; and
said battery unit is rotated around its longitudinal axis so that said housing of said battery unit can engage with a correspondingly formed housing of said electronics unit in the second installed position.

2. The apparatus as claimed in claim 1, wherein:
said electrical contacts, respectively said countercontacts, are part of an installation plug or receptacle, i.e. part of a housing, of said battery unit, respectively said electronics unit.

3. The apparatus as claimed in claim 1, wherein:
said battery unit, by orienting, especially by rotating, especially by rotating around a longitudinal axis of said battery unit, is so connectable with said input circuit of said electronics unit, that either only said first contact is electrically connected with said first countercontact and said second contact with said second countercontact, or that only said second contact is connected with said second countercontact and said third contact with said third countercontact.

4. The apparatus as claimed in claim 1, further comprising:
a blocking means, which serves to prevent at least the electrical contacting of at least one of said contacts, especially said first contact, and/or of at least one of said countercontacts, especially said first countercontact.

5. The apparatus as claimed in claim 4, wherein:
said blocking means, which is composed of an essentially electrically insulating material, serves to close, especially mechanically, at least one of said contacts and/or at least one of said countercontacts.

6. The apparatus as claimed in claim 4, wherein:
said blocking means is replaceable by a contact means, which is composed of an essentially electrically conductive material, which contact means serves to produce electrical contact between at least one of said contacts, especially said first contact, and at least one of said countercontacts, especially said first countercontact.

7. The apparatus as claimed in claim 1, wherein:
for limiting the electrical power available to said electronics unit, especially according to the specifications of the ignition protection type, intrinsic safety, means for electrical current- and/or voltage limiting are provided in a first circuit branch between said first pole of said battery and said third contact and/or in a second circuit branch between said third countercontact and a remainder of said electronics unit.

8. The apparatus as claimed in claim 7, wherein:
the electrical current- and/or voltage limiting occurs through at least a first electrical and/or electronic component, especially a diode, in said first and/or preferably in said second circuit branch.

9. The apparatus as claimed in claim 8, wherein:
a contacting of the battery unit via said first and said second contacts and said first and said second countercontacts serves to bypass the means for electrical current- and/or voltage limiting.

10. The apparatus as claimed in claim 1, wherein:
said input circuit further comprises a first and a second output, via which energy available to said electronics unit is tappable; and
said first countercontact and/or said third countercontact are connected with said second output and;
said second countercontact is connected with said first output.

11. The apparatus as claimed in claim 7, further comprising:
an electrical and/or electronic circuit, which, especially based on an electrical signal in said first and/or said second circuit branch, serves to detect whether the energy supply of said electronics unit occurs essentially via said first and said second contacts, respectively countercontacts or essentially via said second and said third contacts, respectively countercontacts.

12. The apparatus as claimed in claim 11, wherein:
the electrical and/or electronic circuit is composed of a comparator circuit, which compares a first and a second input signal with one another; and
a first component is arranged between a tap for said first input signal and a tap for said second input signal.

13. The apparatus as claimed in claim 12, wherein:
between the tap for said first input signal and a corresponding input of said comparator circuit, a second component corresponding to the first component is arranged.

14. A battery unit for use in an apparatus comprising:
an electronics unit which defines a longitudinal axis and has a housing, wherein:
the battery unit defines a longitudinal axis, has a housing and a battery with a first and second pole;
the battery unit has at least a first, at least a second and at least a third electrical contact;
said first contact and said third contact are connected with said first pole;
said second contact is connected with said second pole;
said electronics unit has an input circuit with at least a first and at least a second electrical countercontact for receiving electrical energy from said battery unit essentially via said first and said second contacts or essentially via said second and third contacts of the battery unit; and
said battery unit is rotated around its longitudinal axis so that said housing of said battery unit can engage with a correspondingly formed housing of said electronics unit in the second installed position.

15. An electronics unit for use in an apparatus comprising:
a battery unit, defining a longitudinal axis and having a housing; and
an electronics unit, defining a longitudinal axis and having a housing, wherein:
said battery unit has a battery with a first and a second pole;
said battery unit has at least a first, at least a second and at least a third electrical contact;
said first contact and said third contact are connected with said first pole;
said second contact is connected with said second pole;
said electronics unit has an input circuit with at least a first and at least a second electrical countercontact for receiving electrical energy from said battery unit essentially via said first and said second contacts or essentially via said second and third contacts of said battery unit; and
said battery unit is rotated around its longitudinal axis so that said housing of said battery unit can engage with a correspondingly formed housing of said electronics unit in the second installed position.

16. A field device of process automation technology having an apparatus comprising:
a battery unit, defining a longitudinal axis and having a housing; and
an electronics unit, defining a longitudinal axis and having a housing, wherein:
said battery unit has a battery with a first and a second pole;
said battery unit has at least a first, at least a second and at least a third electrical contact;
said first contact and said third contact are connected with said first pole;
said second contact is connected with said second pole;
said electronics unit has an input circuit with at least a first and at least a second electrical countercontact for receiving electrical energy from said battery unit essentially via said first and said second contacts or essentially via said second and third contacts of said battery unit; and
said battery unit is rotated around its longitudinal axis so that said housing of said battery unit can engage with a correspondingly formed housing of said electronics unit in the second installed position.

\* \* \* \* \*